Glen M. Johnson
*INVENTOR.*

BY *Clarence A. O'Brien
and Harvey B. Jacobson*
Attorneys

United States Patent Office 3,457,972
Patented July 29, 1969

3,457,972
LUMBER GUIDING SAFETY ATTACHMENT
FOR TABLE SAWS
Glen M. Johnson, Kennewick, Wash., assignor of twenty percent to Leo Moss, Kennewick, Wash.
Filed Jan. 12, 1966, Ser. No. 520,280
Int. Cl. B27b 5/28; B27c 5/02
U.S. Cl. 143—157                    5 Claims

ABSTRACT OF THE DISCLOSURE

An elongate spring arm, releasably, slidably positionable in a slot in a stud, to bias a workpiece to a position against the fence of a saw table. The bolt is releasably positioned in a particularly configured socket carried by the table. The socket may be of bolt-like configuration for releasable positioning in an appropriate hole in the table.

---

The present invention relates to certain new and useful improvements in a safety-type lumber holding attachment for a saw-equipped table, more particularly, a bench or table having a power driven circular saw and equipped, as is common practice in the art, with a workpiece positioning fence, said fence oriented with the usual upwardly projecting portion of the rotary saw blade.

Many and varied guards, workpiece holders and lumber biasing devices, classifiable in general as safety attachments, are old and well known. One prior art spring-loaded safety device is shown in Patent 2,722,247 and another characterized by a so-called spring post, is shown in Patent 947,211. Generally indicaitve of the state of the art, these prior patents teach that it is common practice to mount a vertical or equivalent post on a table or the like and to associate therewith a spring biased finger or equivalent means and wherein the spring finger is yieldingly pressed against a surface of the workpiece while the latter is manually shoved across the surface of the table in contact with the usual upstanding guide rail or fence.

An object of the present invention is to structurally, functionally and in other ways improve upon prior art adaptations. To this end, an appropriately tensioned steel spring blade or arm is provided. This arm is longitudinally bowed and provided at one end with a terminal work abutting head or shoe which rests against the relatively slidable workpiece. The other end of the arm is detachably and adjustably mounted on a holddown anchoring post, more specifically, a slotted nut-retained bolt.

In the present invention, the median slotted portion of the bolt is provided with an integral flange. The flange is fixed at the lower end of the slot and serves to support an edge of the relatively adjustable spring-tensioned finger or arm. That portion of the bolt below the bottom of the flange is grooved lengthwise and circumferentially and is thus fashioned into a splined stud detachably and adjustably keyed in the splined socket portion of a hub-like stud anchoring bushing, said bushing fitting and being mounted in an opening provided therefor in the saw table. This hub or bushing comprises an open-ended internally splined sleeve which, while providing the desired anchor, also permits sawdust, which would otherwise accumulate, to gravitate and fall through the bore of the sleeve.

These together with other objects and advantages which will become subsequently apparent reside in the details of construction and operation as more fully hereinafter described and claimed, reference being had to the accompanying drawings, forming a part hereof, wherein like numerals refer to like parts throughout, and in which:

Figure 1:
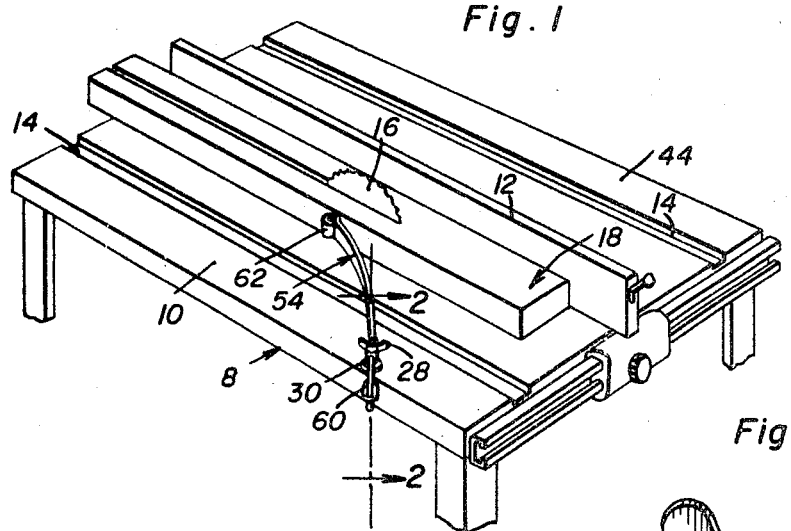
FIG. 1 is a view in perspective of a conventional rotary powdered saw and table combination provided with the improved lumber-guiding safety attachment.
Figure 3:
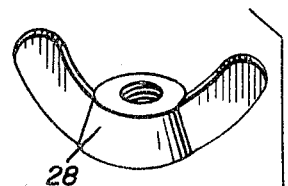
FIG. 3 is an exploded perspective view of the post and adapter means therefor.

Referring to FIG. 1 the conventional leg-supported table saw structure is denoted at 8, the flat top surface of the table being denoted at 10 and the adjustable guide rail or fence at 12. The usual longitudinal open-ended grooves or channels 14 are provided in the top of the table and the power operated rotary saw is denoted at 16. The lumber or workpiece is denoted at 18 and is shown in position atop the table and in end-to-end contact with the guide fence 12 and also in working relation with the rotary saw 16. These components are old in the table saw art. The invention herein disclosed pertains primarily to the safeguarding or safety promoting table attachment. The post means is denoted by the numeral 20 (FIG. 3), wherein it will be observed that said post comprises a simple suitably sized bolt 22 having a vertical slot 24 extending completely through diametrically opposite sides of the median portion, and having an upper screw-threaded shank portion 26 to accommodate a clamping nut, for example, a wing nut 28. The lower median portion of this bolt or post is provided with an integral outstanding washer-like flange denoted at 30 and which has a flat top surface 32 at right angles to the lengthwise axis of the bolt and a bottom flat surface 34 below which a depending end portion is provided. This lower end portion is splined lengthwise and is significantly designated as a splined stud 36. This stud is of a cross-section and length to telescope fittingly into the accommodating socket portion 38 of a sleeve-like anchor 40 which is herein designated as an adapter bushing, as well as a hub. The interior wall of the socket portion is provided with vertical circumferentially spaced splines 42 which serve to accommodate the coordinating splines on the insertable and removable stud 36.

Assuming that the improved attachment is to be applied to a work table which is already in use it will be seen (FIG. 2) that the table is provided on either one or both sides with a hole 44 drilled through the table thus providing a recess for the adaptable hub or bushing 40 and a screw-threaded neck 48 carrying a hub attaching and retaining nut 50. With the construction shown the splined stud 36 is fitted into the nut-held bushing or adapter in the manner shown in FIG. 2. Thus, the bolt or post 20 is in readiness to accommodate an end portion 52 of the spring steel lumber tensioning arm or finger 54. This arm comprises an elongated suitably bowed spring steel blade which in practice is 16 to 18 inches, approximately one-eighth of an inch in thickness, and substantially three-quarters of an inch wide. The rounded end portion 56 is slid through and beyond the slot 24 and is provided with an aperture at 58 to accommodate a limit stop link 60 which dangles freely (in the manner shown in FIGS. 1 and 2) and prevents the portions 52 and 56 from sliding from right to left through the slot 24. The spring arm itself is longitudinally bowed and the free work abutting end is provided with an integral cylindrical head or shoe 62 which in practice abuts the surface or edge of the workpiece or lumber 18, that is, when the device is being used in the manner shown in FIG. 1.

Figure 2:
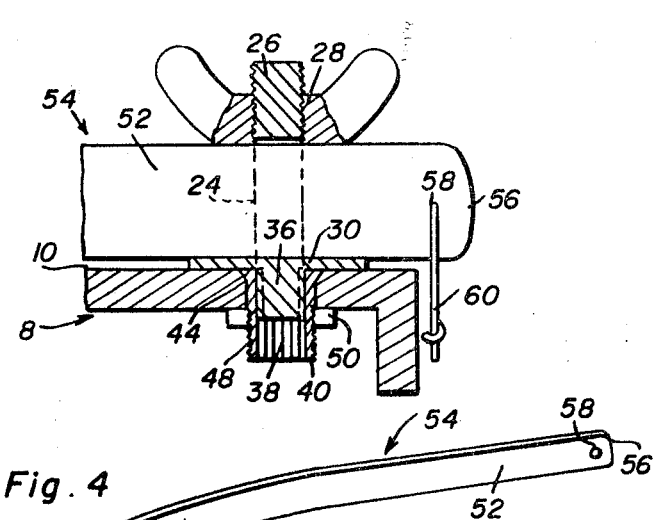
FIG. 2 is an enlarged fragmentary view with parts in section and elevation taken on the plane of the section line 2—2 of FIG. 1.
Figure 4:
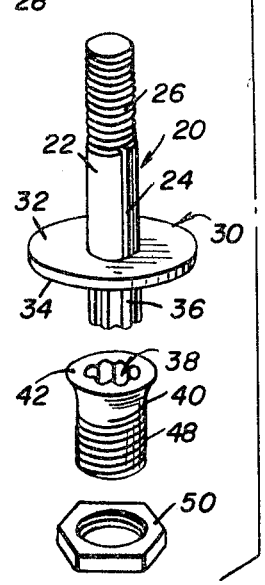
FIG. 4 is a view in perspective of the spring steel pressure exerting or lumber tensioning finger or arm.
Figure 4:
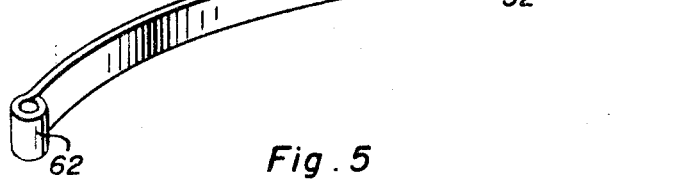

As is known to persons conversant in the art, safety attachments now in use are time-consuming not only to install but require difficult-to-handle clamps and other attaching means and devices. The present invention can be easily attached by simply inserting the splined end 36 into the open-ended splined socket 38 of the nut held hub or bushing 40 fitted in the recess 44 provided therefor in the edge of the table as shown in FIG. 2. The length of the spring arm or finger 54 can be adjusted so that the head or shoe 62 abuts the edge of the workpiece 18 at just the desired angle and under the intended degree of spring responsive pressure. By tightening the wing nut 28 against the upper edge of the blade-like finger it will be seen that the lower edge is clamped against the top surface 32 of the abutment or flange 30, said flange having its bottom side resting firmly against the flat top of the table. To remove, all that is necessary is to lift the attachment out of the splined bushing and store it away. Sawdust can fall through the open-ended bore of the bushing.

One significant advantage of this attachment is that it increases the saw accuracy by exerting even pressure on the lumber. It saves time and reduces the likelihood of injury to a significant minimum. The invention is of the utmost in simplicity and construction and is economical to manufacture and use. The ease of installing the device on any conventional table saw makes it practical. The matched splines make possible an adjustment involving a number of variations in the angle of adjustment as is believed to be self-evident from the disclosure. Actually, the lower edge of the spring steel finger rides against the flat top of the washer-like flange 30.

Figure 5:
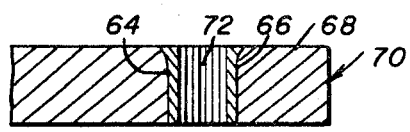
FIG. 5 is a view of a table with a permanently built-in adapter.

It is also within the purview of the invention to permanently embed the bushing (for example the splined bushing 64 FIG. 5) in a recess or pocket 66 expressly prepared therefore in the surface 68 of the table 70, that is, at the time the table is manufactured. Again, the socket portion of the bushing is provided with suitable circumferentially spaced keying ribs or splines 72 to accommodate the aforementioned splined stud on the aforementioned bolt-type post 20.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An attachment for a table saw comprising, in combination, a cylindrical hub-like bushing having a socket opening through upper and lower ends of said bushing, the interior wall portion of said socket being provided with circumferentially spaced ribs and intervening grooves defining splines, a bolt having a lower end portion provided with splines fitting adjustably but retentively into said splined socket, said bolt being provided intermediate its ends with an integral outstanding flange and above said flange with a slot opening through diametrically opposite sides of the shank of the bolt, the upper end of said shank being screw-threaded and provided with an assembling and holddown nut, and, in combination, an elongated arcuately bowed tension exerting arm having abutment means on one end to engage the workpiece and having its other end slidingly and adjustably mounted in said slot.

2. An attachment for a table having a rotary power operated saw comprising:
   a bushing adapted to be retentively anchored in a recess provided therefor in the table, said bushing adapted to be anchored on the table in a position of vantage relative to the usual rotary saw and customary relatively stationary workpiece positioning fence mounted atop said table proximal to said saw, said bushing having a socket and the wall of said socket having circumferentially spaced splines;
   an elongated flexible resilient arm adapted to reside lengthwise in an operative position atop the table and having an inwardly disposed free end residing in a firm but yieldable contact with a surface of the workpiece;
   a post having a slot slidably adjustably mounting the outwardly disposed end of the arm and having a stud-like lower terminal end fitting telescopingly and retentively into the said bushing, said stud-like lower end of said post having circumferentially spaced ribs and grooves defining splines orientated and releasably adjustably coordinated with the first-named splines; and
   means operatively mounted on said post and cooperatively engageable with the arm to retain the arm in said slot in a given adjusted tension imposing position.

3. The structure according to claim 2 wherein the socket opens through both top and bottom ends of the bushing, and the bushing is provided with a screw-threaded neck, and an assembling and retaining nut threadedly engaged on said neck, the neck and combining nut serving to fasten the bushing removably on the table with which it is cooperable.

4. The attachment according to claim 2 wherein the said post comprises a bolt, the lower end portion of the bolt having an integral right angularly disposed outstanding flange, the flange having a bottom side adapted to reside firmly atop the underlying portion of the table and a top side coplanar with the bottom of said slot, so that the portion of the arm extending through the slot resides atop the flange.

5. The attachment according to claim 4 wherein the upper end of the bolt, the end constituting the shank, is externally screw-threaded and provided with an arm clamping and holddown nut, the nut being clampingly engageable with a cooperating upper edge portion of the arm.

References Cited

UNITED STATES PATENTS

| | | | |
|---|---|---|---|
| 438,096 | 10/1960 | Colton | 144—306 |
| 1,402,667 | 1/1922 | Shaw | 144—253 X |
| 534,447 | 2/1895 | McConnell | 144—253.6 |
| 1,022,176 | 4/1912 | Boothby | 144—253.6 X |
| 2,722,247 | 11/1955 | Schroeder | 144—253.6 X |

FRANCIS S. HUSAR, Primary Examiner

U.S. Cl. X.R.

144—253